United States Patent [19]

Kozuki et al.

[11] Patent Number: 5,047,875
[45] Date of Patent: Sep. 10, 1991

[54] RECORDING SYSTEM WHICH CAN RECORD SIGNALS FROM TWO FIELDS FOR THE COMPOSITION OF ONE PICTURE

[75] Inventors: Susumu Kozuki, Tokyo; Nobuo Tezuka, Kawasaki; Makoto Masunaga, Tokyo, all of Japan

[73] Assignee: Canon Kabushiki Kaisha, Tokyo, Japan

[21] Appl. No.: 587,639

[22] Filed: Sep. 20, 1990

Related U.S. Application Data

[63] Continuation of Ser. No. 273,679, Nov. 21, 1988, abandoned, which is a continuation of Ser. No. 511,180, Jul. 6, 1983, abandoned.

[30] Foreign Application Priority Data

Jul. 7, 1982 [JP] Japan ................. 57-119064

[51] Int. Cl.$^5$ ............................................. H04N 5/76
[52] U.S. Cl. ................................... 360/35.1; 358/342; 358/909
[58] Field of Search .............. 360/19.1, 33.1, 35.1, 360/36.1, 37.1; 358/213.11, 213.13, 213.15, 213.19, 213.22, 213.23, 213.25, 213.26, 335, 342, 906, 909

[56] References Cited

U.S. PATENT DOCUMENTS

| | | | |
|---|---|---|---|
| 3,878,560 | 4/1975 | Ramage | 360/19.1 X |
| 4,058,840 | 11/1977 | Kasprzak | 360/35.1 X |
| 4,065,794 | 12/1977 | Shutterly | 360/35.1 X |
| 4,131,919 | 12/1978 | Lloyd et al. | 358/906 X |
| 4,133,009 | 1/1979 | Kittler et al. | 358/906 X |
| 4,262,301 | 4/1981 | Erlichman | 358/906 X |
| 4,330,796 | 5/1982 | Anagnostopoulos | 358/906 X |
| 4,334,247 | 6/1982 | Lemke | 360/37.1 X |
| 4,450,488 | 5/1984 | Golding | 358/342 |
| 4,472,742 | 9/1984 | Hasegawa et al. | 358/906 X |
| 4,475,131 | 10/1984 | Nishizawa et al. | 358/906 X |
| 4,486,783 | 12/1984 | Tanaka et al. | 358/213 |
| 4,504,855 | 3/1985 | Kuwayama | 358/44 |
| 4,504,866 | 3/1985 | Saito | 358/906 X |
| 4,527,205 | 7/1985 | Konishi | 360/35.1 |
| 4,546,391 | 10/1985 | Kimura | 360/35.1 X |
| 4,603,354 | 7/1986 | Hashimoto et al. | 358/213.13 X |

FOREIGN PATENT DOCUMENTS 99423 9/1974 Japan .

Primary Examiner—Roy N. Envall, Jr.
Assistant Examiner—W. R. Young
Attorney, Agent, or Firm—Fitzpatrick, Cella, Harper & Scinto

[57] ABSTRACT

A recording system comprises an image pick-up recording device to record the picture information obtained through the image pick-up on a recording medium by a recording head; and a control device to change the relative location of the head and the medium after the information of one picture has been recorded in a predetermined location on the medium and to prevent the next picture information from being read out during the period of time until the completion of that displacement. The recording sytem may be provided with a memory for the picture information and a control device for allowing part of the picture information to be recorded in the selected portion on the medium. The control device also permits the other portion of the picture information stored in the memory to be recorded in the other portion on the medium after changing the relative location of the head and the medium.

20 Claims, 11 Drawing Sheets

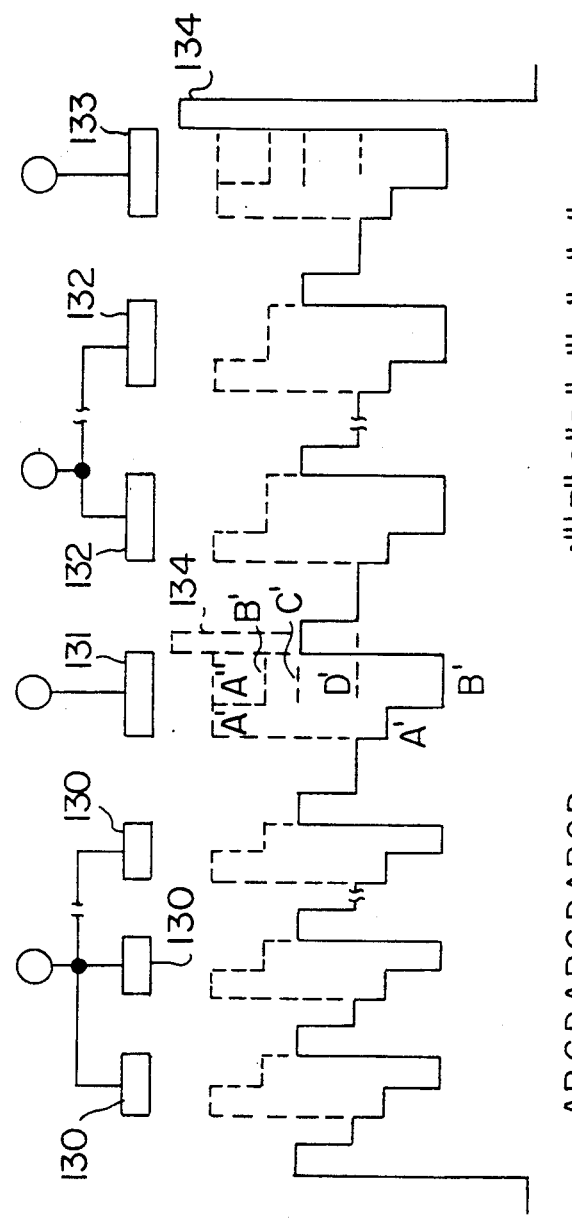

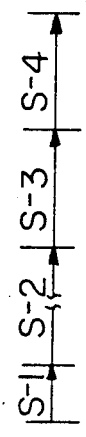
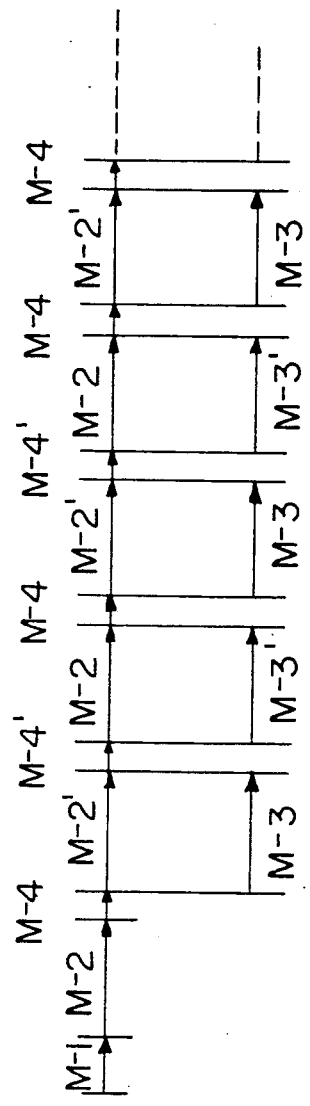
FIG. 11(a)
FIG. 11(b)

RECORDING SYSTEM WHICH CAN RECORD SIGNALS FROM TWO FIELDS FOR THE COMPOSITION OF ONE PICTURE

This application is a continuation of application Ser. No. 07/273,679 filed Nov. 21, 1988, which is a continuation of application Ser. No. 07/511,180, filed July 6, 1983, both now abandoned.

BACKGROUND OF THE INVENTION

1. Field of the Invention

This invention relates to an improved recording system in which signals obtained from an information source can be stably recorded in different portions on a recording medium, and more particularly to a recording system in which a plurality of picture information obtained from image pick-up devices such as a CCD or the like can be stably recorded during a short period of time.

2. Background of the Invention

For example, when one field of video signals is recorded in one track on a recording medium such as a magnetic sheet, it is conventionally known that a gate is provided in a signal path connecting a video signal source with a recording head, and the gate is opened intermittently during, for example, only one field interval per several fields to record the video signals in each track, and that while the gate is closed, the recording head is shifted to face the next track.

However, it is extremely difficult to shift the recording head within the limited period of vertical blanking time, causing a drawback in that the video signals recorded would have been forced to be intermittent.

Therefore, when one tries to compose a picture using the signal of one field twice, the picture must have been blurred or unfocussed if the subject is a moving object, and a satisfactory picture quality will not be obtained if the signal of one field is used once.

SUMMARY OF THE INVENTION

The present invention intends to provide a recording system which can eliminate such drawbacks in the prior art. Particularly, it is an object of the invention to provide a recording system which can record the signals of two fields for the composition of one picture to realize a picture of high quality for the recording system in which only one-field signal is recorded in one track.

For this purpose, the present invention has such features that: the information recorded in a recording medium is read out through image pick-up means such as an image pick-up device on an image pick-up tube, etc. or from any information sources after the completion of head shift; memory means is provided to temporarily memorize the information to be reproduced by means of such image pick-up means or from information sources until the completion of head shift; and detecting means is also provided to detect the completion of head shift.

Accordingly, in an embodiment of the present invention, the signal to be reproduced through the image pick-up device or information sources is read out upon the completion of head shift. For this purpose, a timer device is used in place of the detecting means. This timer device is operated upon starting of the head shift and outputs the signal after the time period necessary for the head to be shifted has elapsed. Therefore, the constitution of the recording system can be made simple.

In addition, according to the embodiment of the invention, the information on the photoreceptive surface of the image pick-up means is divided into the signal of the fields bearing even numbers and the signal of the fields bearing odd numbers, thereby recording in the individual tracks. Therefore, the picture will not be blurred or out of focus even when the picture of one frame is composed using the signals in two tracks.

Furthermore, according to the embodiment of the present invention, the memory means is commonly utilized by the storage array of an image pick-up device of the frame transfer type or the like; accordingly, many features are realized by this simple and small recording system.

BRIEF DESCRIPTION OF THE DRAWINGS

FIG. 10 shows the condition of the interior potential of the CCD of FIG. 8; and

FIG. 11, consisting of (a) and (b), shows the sequence when the FIG. 8 CCD is used to photograph a stationary image and the sequence when the FIG. 8 CCD is used to photograph a moving image;

DETAILED DESCRIPTION OF THE PREFERRED EMBODIMENTS

The present invention will now be described in detail hereinbelow with respect to preferred embodiments.

Figure 1:
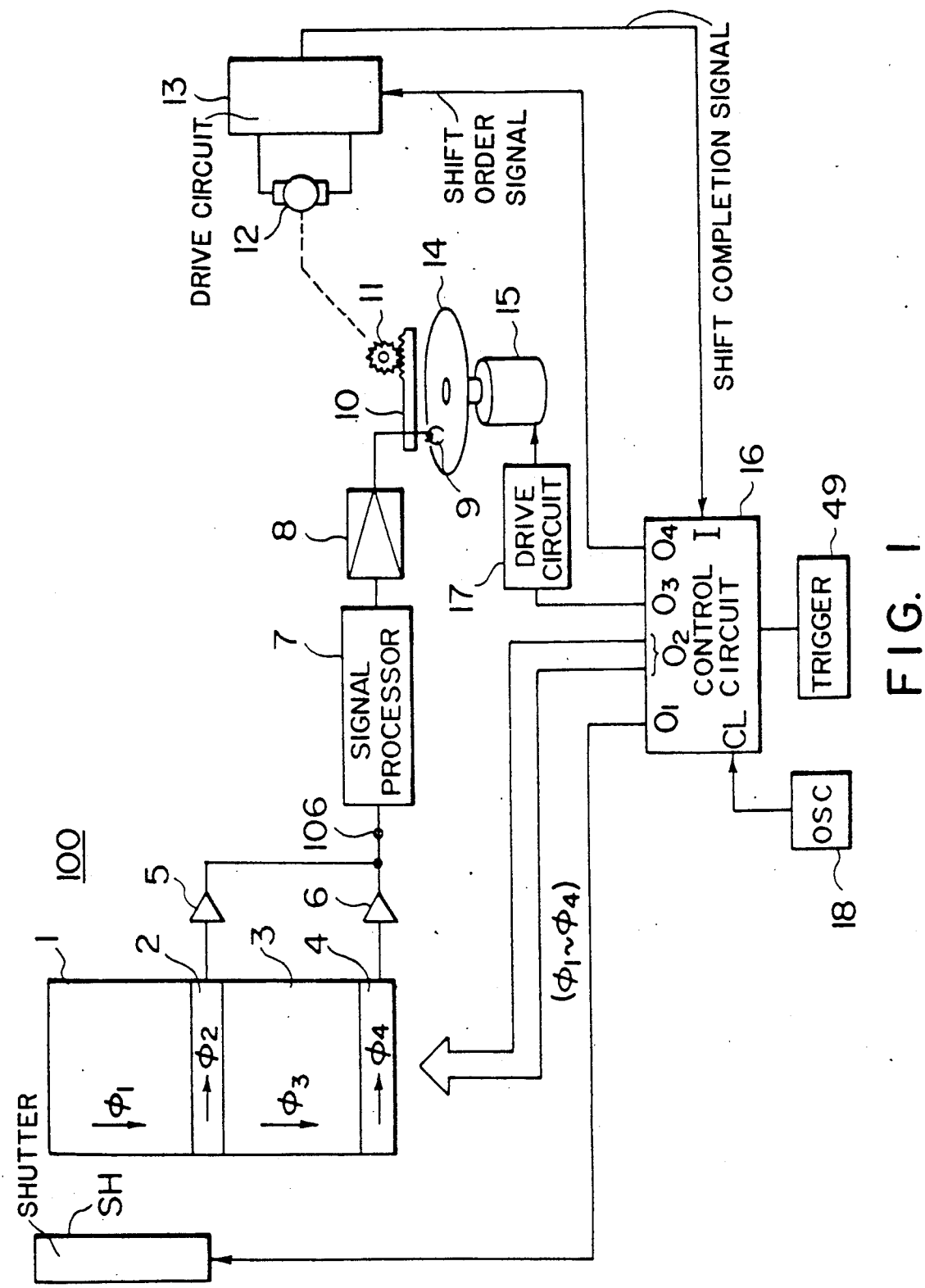
FIG. 1 is a diagrammatic view showing a first embodiment of a recording system according to the present invention.

FIG. 1 shows a block diagram of a recording system including an image pick-up system to which the present invention is applied. In FIG. 1, a reference numeral 100 indicates a CCD of the frame transfer type as illustrated in U.S. Pat. No. 4,504,855, and a numeral 1 shows an image sensing array (namely, a photoreceptive section) through which the light incidence is controlled by means of a shutter SH. A numeral 3 denotes a storage array as a light-shielded memory means, and the electric picture information formed in the image sensing array 1 is temporarily memorized in this storage array 3. The output terminals of horizontal transfer registers 2 and 4 of one line are connected respectively to amplifiers 5 and 6. These horizontal shift registers 2 and 4 are also shielded against light.

The charges in the image sensing array 1 and storage array 3 are respectively shifted in the directions indicated by the arrows in FIG. 1 by means of shift pulse $\phi_1$ and $\phi_3$. The charges in the horizontal shift registers 2 and 4 are respectively shifted in the directions indicated by the arrows in FIG. 1 by means of shift pulses $\phi_2$ and $\phi_4$.

In this embodiment, the number of picture elements in the image sensing array 1 is twice as large as that in the storage array 3.

The detailed construction of the CCD with such a constitution and its driving method are as disclosed, for example, in Japanese Laid Open Gazette No. 146587/1981 or in U.S. Pat. No. 4,504,855, as noted above. In particular, Japanese Laid Open Gazette No. 146587/1981 describes a known frame transfer type CCD depicted in FIG. 8.

Figure 8:
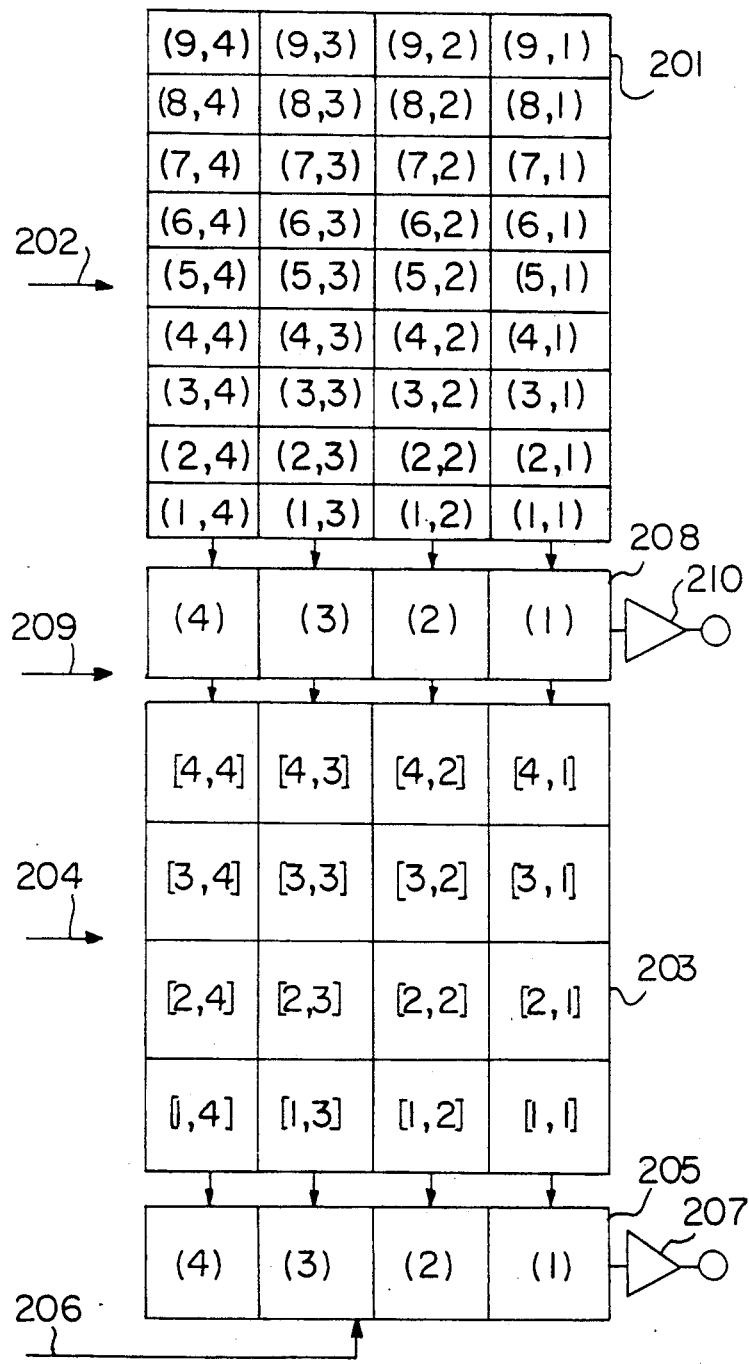
FIG. 8 schematically shows the construction of a known frame transfer type CCD.

FIG. 8 shows the construction of a frame transfer type CCD described in the above-referenced Japanese Laid Open Gazette No. 146587/1981.

In FIG. 8, reference numeral 201 designates the image sensing portion of the frame transfer type CCD. In this image sensing portion, for example, in the case of the NTSC system, the number of cells in the vertical direction is set to a number substantially equal to the number of scanning lines, i.e., on the order of 490. That is, this CCD has a number of cells about twice that in the conventional frame transfer type CCD. As the number of cells in the horizontal direction of the image sensing portion 201, a number corresponding to the color sub-carrier frequency, i.e., a number on the order of 390 or 570, is usually adopted.

In FIG. 8, there is shown an example in which nine elements in the vertical direction and four elements in the horizontal direction are arranged. In FIG. 8, reference numeral 202 designates an electrode for applying to this image sensing portion a voltage for effecting light reception and transfer.

In FIG. 8, reference numeral 203 denotes a storing portion, in which the number of cells in the vertical direction is about ½ of that of the image sensing portion and a number of cells equal to that of the image sensing portion 201 are arranged in the horizontal direction. Accordingly, this storing portion comprises a number of cells equal to that of the storing portion of the conventional frame transfer type CCD.

In FIG. 8, reference numeral 204 designates an electrode for applying a voltage for transferring charge as in the image sensing portion.

In FIG. 8, reference numeral 205 denotes a horizontal transfer register which comprises a row of charge transfer portions comprising a number of cells substantially equal to the number of cells in the horizontal direction of the image sensing portion or the storing portion.

Designated by 206 in FIG. 8 is an electrode for applying a voltage for transferring the charge of the horizontal transfer register 205.

Denoted by 207 in FIG. 8 is an amplifier for converting the charge transferred from the horizontal transfer register 205 into a voltage output.

This frame transfer type CCD does not greatly differ in construction from the conventional frame transfer type area sensor except that the number of cells in the vertical direction of the image sensing portion is twice that in the conventional frame transfer type area sensor. A great difference between the two is that a second horizontal transfer register 208 substantially identical to the horizontal transfer register 205 is provided between the image sensing portion 201 and the storing portion 203. Reference numeral 209 designates an electrode for applying a voltage for transferring the charge in the second horizontal transfer register, and reference numeral 210 denotes an amplifier for converting the transferred charge into a voltage.

There are several charge transfer methods such as single phase drive, two-phase drive, three-phase drive, four-phase drive, etc., and any of these is applicable, but taking the single phase drive method as an example for simplicity of description, the constructions of the second horizontal transfer register 208 and the storing portion 203 will hereinafter be described by reference to FIG. 9.

The single phase drive method herein referenced is described in the U.S. Pat. No. 4,229,752 and the detailed operation thereof need not be described herein.

Figure 9:
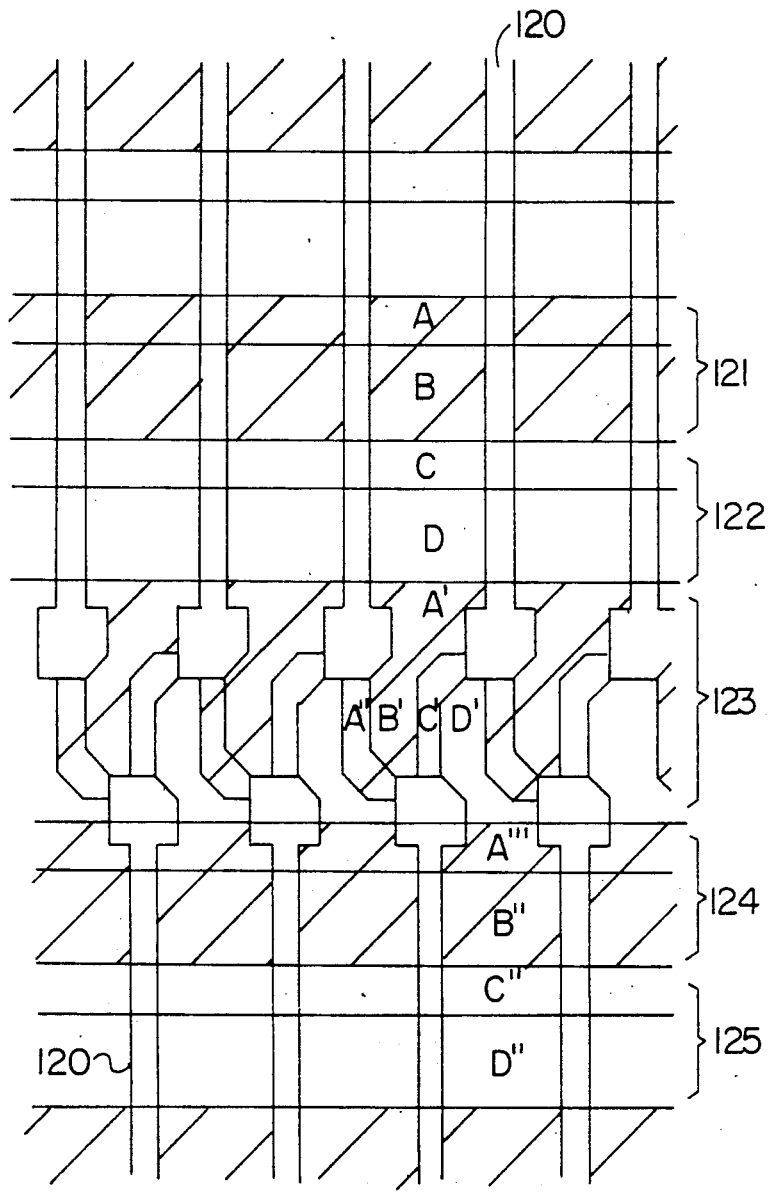
FIG. 9 is a schematic view of a portion of the CCD of FIG. 8.

Referring to FIG. 9, reference numeral 120 designates a channel stopper for preventing leakage of charge between the cells in the horizontal direction.

In FIG. 9, reference numeral 121 denotes the poly-silicon electrode of the image sensing portion, and the area to which this electrode is attached comprises an area A and an area B which differ from each other in the potential condition in the silicon. Reference numeral 122 designates an area in which a virtual electrode is formed in the silicon. The area 122 comprises an area C and an area D which differ from each other in the potential condition in the silicon.

In the vertical direction, one cell consists of these areas A, B, C and D.

In FIG. 9, 123 designates a second horizontal transfer register area. In this area, a poly-silicon electrode is formed in the shape of comb-teeth indicated by hatching, and the portion below this poly-silicon electrode is divided into areas A', B' and C' which differ in the potential condition. The areas A' and A" are identical in potential, but are separated from each other by a channel stopper. The areas C' and D' are set to the same potential as the virtual electrode portion 122 of the image sensing portion. 124 and 125 are constructed similarly to 121 and 122, respectively, of the image sensing portion.

FIG. 10 shows the interior potential condition of the CCD of the construction shown in FIG. 9.

In FIG. 10, reference numeral 130 designates the poly-silicon electrodes of the image sensing portion corresponding to 121 of FIG. 9, and all of the poly-silicon electrodes of the image sensing portion are commonly connected so that a voltage for charge transfer is applied thereto. The portion below the poly-silicon electrodes 130 is divided into areas A and B as described in connection with FIG. 9, the area A being higher in potential condition than the area B. The dotted lines in FIG. 10 show the condition in which the poly-silicon electrodes 130 are at high negative potential, and the solid lines show the potential at which the potential of the poly-silicon electrodes 130 are slightly negative or positive.

The potential of the virtual electrode portion 122 of FIG. 9 is slightly higher in the area C than in the area D, as shown in FIG. 10. The potential of this portion does not depend on the voltage applied to the electrodes 130, but is always maintained constant. Accordingly, if a predetermined voltage is applied to the poly-silicon electrodes 130, charge will be stored and, if a pulse-like voltage is applied to the poly-silicon electrodes 130, charge will be transferred. Further description is not needed.

In FIG. 10, reference numeral 131 designates the poly-silicon electrode of the second horizontal transfer register. This electrode is separated from the other electrodes so that an independent voltage is applied thereto. The interior potential of this horizontal transfer register is as shown below the poly-silicon electrode 131 of FIG. 10.

In FIG. 10, reference numeral 132 designates the poly-silicon electrodes of the storing portion. The interior potential of this storing portion is similar to that of the image sensing portion. Reference numeral 133 denotes the electrode of the first horizontal transfer register (205 in FIG. 8). The first horizontal transfer register is similar in construction to the second horizontal transfer register, but the former differs slightly from the latter in that one side thereof is closed by a channel transfer. Reference numeral 134 shows the potential condition of the channel stopper.

The function of the charge in the second horizontal transfer register will hereinafter be described. The charge stored in the area B of the image sensing portion has its potentials in areas A and B increased as indicated by dotted lines in FIG. 10 by a pulse voltage of negative potential being applied to the poly-silicon electrodes 130 and is transferred into the potential well area D of 122 of FIG. 9. When, at this time, a slightly negative or positive potential is applied to the poly-silicon electrode 131 of the second horizontal transfer register, the potentials of the area A' and B' assume the potential conditions indicated by solid lines in FIG. 10 and the charge in the area D enters the area B' through the area A'. Subsequently, when a negative high potential is applied to the electrode 131, the potentials of the areas A' and B' assume the conditions indicated by dotted lines and the charge in the area B' is transferred through the area C' (which has a predetermined potential indicated by a dotted line) to the area D' (which has a predetermined potential indicated by a dotted line). When, at this time, a slightly negative or positive voltage is applied to the polysilicon electrodes 132 of the storing portion, the potentials of the area D' to the areas A''' and B'' fall as indicated by solid lines and the charge in the area D' is transferred through the area A''' to area B''.

The charge thus transferred to the area B'' of the image sensing portion is transferred through the area C'' to the area D'' because the potentials of the areas A''' and B'' become as indicated by dotted lines by a pulse-like voltage of negative potential being applied to the polysilicon electrodes 132 of the storing portion. Consequently, by a pulse voltage as the drive signal being applied to the electrodes 132, the stored charge is transferred to B''→D''→B'' in succession and transferred to the first horizontal transfer register 205, and then can be read out through the first horizontal transfer register 205. The above-described flow of the charge shows that it is entirely equal in operation to that in the conventional frame transfer type CCD which does not have the second horizontal transfer register.

A description will now be given of the flow of the charge in a case where the signal is read out through the second horizontal transfer register.

The charge transferred to the area D' has been transferred to the storing portion by a slightly negative or positive potential being applied to the poly-silicon electrodes 132 of the storing portion in the above-described operation, but a negative high voltage is applied to these electrodes to hold the potentials of the areas A''' and B'' as indicated by dotted lines and a pulse-like voltage is applied to the second horizontal transfer register 131 to cause the potentials of the areas A'' and B' to alternately shift to the conditions indicated by solid lines and dotted lines, whereby the charge in the area D' is transferred to A''→B'→C'→D' in the horizontal direction and a signal read-out operation is executed through the amplifier (210 in FIG. 8).

Reference is now made to FIG. 11 to describe the operation when the known CCD device is operated in an actual camera.

FIG. 11(a) shows the operating condition when the device is operated in a video still camera, and FIG. 11(b) shows the operating condition when the device is operated in a video camera for photographing moving images.

A description will first be given of a case where the device is operated in a video still camera.

The condition S-1 of FIG. 11(a) shows the all clear condition in which the charge, stored by a dark current or the like is cleared through an anti-blooming drain immediately before the exposure operation or in which the CCD is operated at a high speed to cause the charge to be discharged outwardly and cleared.

The shutter is then opened and the condition shifts to the exposure condition, i.e., the storing condition (S-2) of the image-sensing portion. The condition then shifts to the first field read-out condition (S-3) of the horizontal transfer register 208.

In the condition (S-2), the shutter is closed in a predetermined exposure time and an image signal (charge) is stored on each cell shown in FIG. 8, whereafter in the condition (S-3), the charges stored in the cells of the image sensing portion are transferred in the vertical direction by two lines each. That is, in the case of the FIG. 8 embodiment, the charges stored in (1,1)–(1,4) are transferred to the cells [4,1]–[4,4] of the storing portion through the second horizontal transfer register 208, and the charges stored in (2,1)–(2,4) are transferred to the second horizontal transfer register 208. Likewise, the charges stored in the cells in the other lines are also transferred by two lines. Thereby, the charges stored in the sections (3,1)–(3,4), (4,1)–(4,4), (5,1)–(5,4), (6,1)–(6,4), (7,1)–(7,4), (8,1)–(8,4) and (9,1)–(9,4) are respectively transferred to the sections (1,1)–(1,4), (2,1)–(2,4), (3,1)–(3,4), (4,1)–(4,4), (5,1–(5,4), (6,1)–(6,4) and (7,1)–(7,4).

After the charges have been transferred by two lines in this manner, the charges transferred to the second horizontal transfer register 208 are delivered outwardly through the amplifier 210. Thereby, the stored charges transferred to the horizontal transfer register 208 in the described manner, namely, the charges stored in (2,1)–(2,4) during exposure, are put out serially.

Thereafter, the stored charges in the cells of the image sensing portion are again transferred by two lines. Thereby, the charges transferred to the sections (1,1)–(1,4), namely, the charges stored in (3,1)–(3,4) during exposure, shift to the cells [4,1]–[4,4] of the storing portion through the horizontal transfer register, and the charges transferred to the sections (2,1)–(2,4), namely, the charges stored in (4,1)–(4,4) during exposure, are transferred to the horizontal transfer register 208. Also, at this time, the charges transferred to the cells in each line of the storing portion 203 are transferred by one line. Consequently, the charges previously transferred to the cells [4,1]–[4,4], namely, the charges stored in (4,1)–(4,4) during exposure, are transferred to the cells [3,1]–[3,4]. Thereafter, reading-out of the charges transferred to the horizontal transfer register is again effected, and the charges transferred to the horizontal transfer register 208 and stored in (4,1)–(4,4)

during exposure as described above are delivered serially. Thereafter, in a similar manner, the operation of transferring by two lines the charges stored in the cells of the image sensing portion 201 and transferring by one line the charges transferred to the cells of the storing portion 203 and the operation of reading out the charges transferred to the horizontal transfer register 208 are executed alternately, whereby the charges stored in (2,1)-(2,4), (4,1)-(4,4), (6,1)-(6,4) and (8,1)-(8,4) during exposure are successively delivered from the second horizontal transfer register 208. That is, the first field read-out operation is executed. Also, the charges stored in (1,1)-(1,4), (3,1)-(3,4), (5,1)-(5,4) and (7,1)-(7,4) during exposure are respectively transferred to the cells [1,1]-[[1,4], [2,1]-[2,4], [3,1]-[3,4] and [4,1]-[4,4] of the storing portion. After the first field read-out operation has thus been executed, the condition shifts to the second field read-out condition, namely, the condition S-4. In the condition S-4, the charges transferred to the cells in each line of the storing portion are transferred by one line, whereafter the charges transferred to the first horizontal transfer register 205 are read out, whereby the charges stored in (1,4)-(4,4), (3,1)-(3,4), (5,1)-(5,4), (7,1)-(7,4) and (9,1)-(9,4) during exposure are delivered from the horizontal transfer register, thus terminating the second field read-out.

Thus, according to the known frame transfer type CCD, it is possible for the image signals corresponding to one frame recorded at the same point of time to read out the first field, and the interlaced second field as in the usual TV operation.

A description will now be given of the operation when the known device is operated in an ordinary video camera for taking out video signals of moving pictures.

The condition M-1 of FIG. 11(b) corresponds to the operation S-1 of FIG. 11(a). However, this operation is not indispensable.

In this case, the shutter is not necessary and storage and read-out are repeated simultaneously. M-2, M-2', ... show the storing conditions, and the prime (') indicates the second field. That is, the charge stored at M-2 (the first field) is read out at M-3, and the charge stored at M-2' (the second field) is read out M-3'.

The condition M-4 shows the condition in which the charges stored in the image sensing portion are transferred to the storing portion.

The frame transfer type CCD of this type has 490 cells in the vertical direction of the image sensing portion and 245 cells in the storing portion and therefore differs from the conventional frame transfer type CCD in the operation of transferring charges from the image sensing portion to the storing portion and the interlace method. This operation will hereinafter be described by reference to FIG. 8.

First, after exposure and storage have been effected in the condition M-2, transfer of the charges stored in the image sensing portion to the storing portion is effected in the condition M-4. In this transfer operation, the charges stored in (1,1), (1,2), (1,3) and (1,4) are first transferred to [4,1], [4,2], [4,3] and [4,4] of the storing portion 203 through the second horizontal transfer register 208. Subsequently, the charges in (2,1), (2,2), (2,3) and (2,4) are likewise transferred to [4,1], [4,2], [4,3] and [4,4]. At this time, no pulse voltage is applied to the storing portion, and the charges stored in (1,1)-(1,4) during exposure are held in [4,1]-[4,4]. Thereby, the charges stored in two rows, i.e., (1,1)-(1,4) and (2,1)-(2,4) of the image sensing portion, are added to [4,1]-[4,4].

Subsequently, one line of the storing portion is transferred, that is, the charges added in [4,1]-[4,4] are transferred to [3,1], and in the manner described above, two lines of the image sensing portion, namely, the charges stored in (3,1)-(3,4) and (4,1)-(4,4) during exposure, are again transferred to [4,1]-[4,4] and added therein. Thereafter, the operation of transferring one line of the storing portion and the operation of transferring two lines of the image sensing portion to [4,1]-[4,4] and adding them therein are repeated in the same manner, whereby the added charges in (1,1)-(1,4) and (2,1)-(2,4) are transferred to [1,1]-[1,4] of the storing portion, the added charges in (3,1)-(3,4) and (4,1)-(4,4) are transferred to [2,1]-[2,4], the added charges in (5,1)-(5,4) and (6,1)-(6,4) are transferred to [3,1]-[3,4], and the added charges in (7,1)-(7,4) and (8,1)-(8,4) are transferred to [4,1]-[4,4].

Thereafter, the condition shifts to the conditions M-2' and M-3 and exposure and storage operations are executed while, at the same time, the signals transferred to the storing portion 203 as described above are transferred to the horizontal transfer register 205 line by line and the signals transferred to the horizontal transfer register are delivered from the horizontal transfer register. Thereby, the first field read-out operation is executed.

After the first field read-out operation has been terminated in this manner, the operation of transferring the charges stored in the image sensing portion 201 to the storing portion 203 by M-2' is executed at M-4. This is the second field read-out operation and therefore, transfer and addition of two rows of the image sensing portion are executed with the cells shifted by one line when the charges are transferred from the image sensing portion 201 to the cells [4,1]-[4,4].

That is, for the second field, the charges stored in the cells (2,1)-(2,4) and the cells (3,1)-(3,4), the charges stored in the cells (4,1)-(4,4) and the cells (5,1)-(5,4), and the charges stored in the cells (6,1)-(6,4) and (7,1)-(7,4) are respectively transferred to [4,1]-[4,4] and added therein, whereby the charges added to each line of the storing portion 203 are transferred to [4,1]-[4,4] and added therein, whereby the charges added to each line of the storing portion 203 are transferred and stored. Thereafter, by M-3', the charges stored in the storing portion 203 are delivered by the horizontal transfer register 205, whereby the second field read-out operation is terminated. When two rows of the image sensing portion cells are added in this manner, the first transfer and addition operation and the second transfer and addition operation are shifted by one line, whereby a signal interlaced with the first field can be obtained and image photographing can be executed as a video camera.

As can be understood from the above description, this known frame-transfer type CCD comprises a second horizontal transfer register located between the image sensing portion and the storing portion. Therefore, it can be used in a video still camera such that the first field signal is first read out and then the second field signal interlaced with the first field signal is read out, the image signals for each frame are obtained in the same signal form as in the conventional signal processing, and the stationary images are readily obtained with higher resolving power than in previous video signal processing circuits. Furthermore, this known frame-transfer type CCD has an advantage that it can be used exclusively in a video still camera as above-mentioned and also in an ordinary video camera.

Returning to FIG. 1, a numeral 106 indicates a video signal input terminal; 7 represents a signal processor; 8 a recording amplifier; 9 a recording head; and 10 shows a moving member as shift means of which the head is fixed, and a part thereof is formed with a rack portion adapted to come into engagement with a pinion 11.

The pinion 11 is revolved by a predetermined value at the desired time by a stepping motor 12 to cause the recording head 9 to be shifted at a predetermined pitch, thereby selecting different tracks on a magnetic disc 14 as a recording medium. The motor 12 is controlled by a motor drive circuit 13. The magnetic disc 14 is rotated by a motor 15, which is controlled by a motor drive circuit 17. The shutter SH, CCD, motor drive circuits 13 and 17 are controlled by a control circuit 16 according to the present invention. A numeral 18 indicates a reference clock oscillator and 49 denotes a trigger circuit including a trigger button to start recording.

Figure 2:
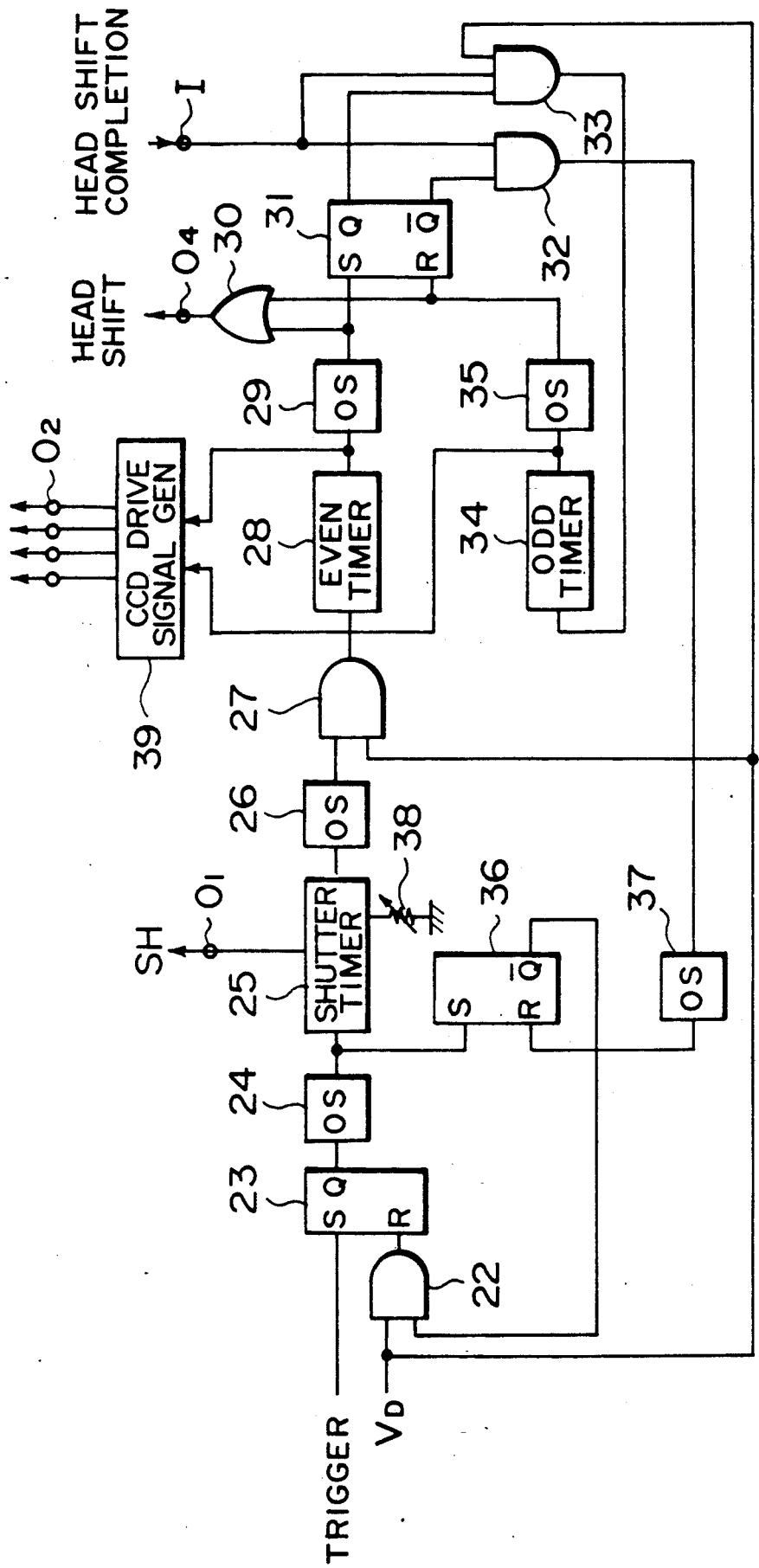
FIG. 2 is a block diagram showing an example of the constitution of the control circuit 16 shown in FIG. 1.

FIG. 2 is a block diagram illustrating an example of the internal constitution of the control circuit 16 shown in FIG. 1. This control circuit 16 includes: R-S flip-flops 23, 31 and 36; one-shot circuits 24, 26, 29 and 35 which respond to the trailing edges; a one-shot circuit 37 which responds to the leading edge; the one-shot circuit 26 generates a pulse with the length of one vertical interval of a television signal; AND gates 22, 27, 32 and 33; and an OR gate 30.

In FIG. 2, the control circuit 16 also includes: a shutter timer 25 to output a signal at a higher level for only the period of time corresponding to the opening time of the shutter SH; a set resister 38 to set the opening time of the shutter; an EVEN timer 28 and an ODD timer 34 which output signals at a higher level in one vertical interval, respectively. As described later, the signals on the lines bearing odd numbers among the information of one picture formed at the image sensing array 1 of the CCD are read out while the EVEN timer 28 is at a higher level. The signals on the lines bearing even numbers are read out while the ODD timer 34 is at a higher level.

Each flip-flop is reset when the power is turned on. A number 39 indicates a CCD drive signal generator as driving means for generating such signals with timing as shown in FIG. 4 in response to the outputs of the timers 28 and 34.

Figure 3:
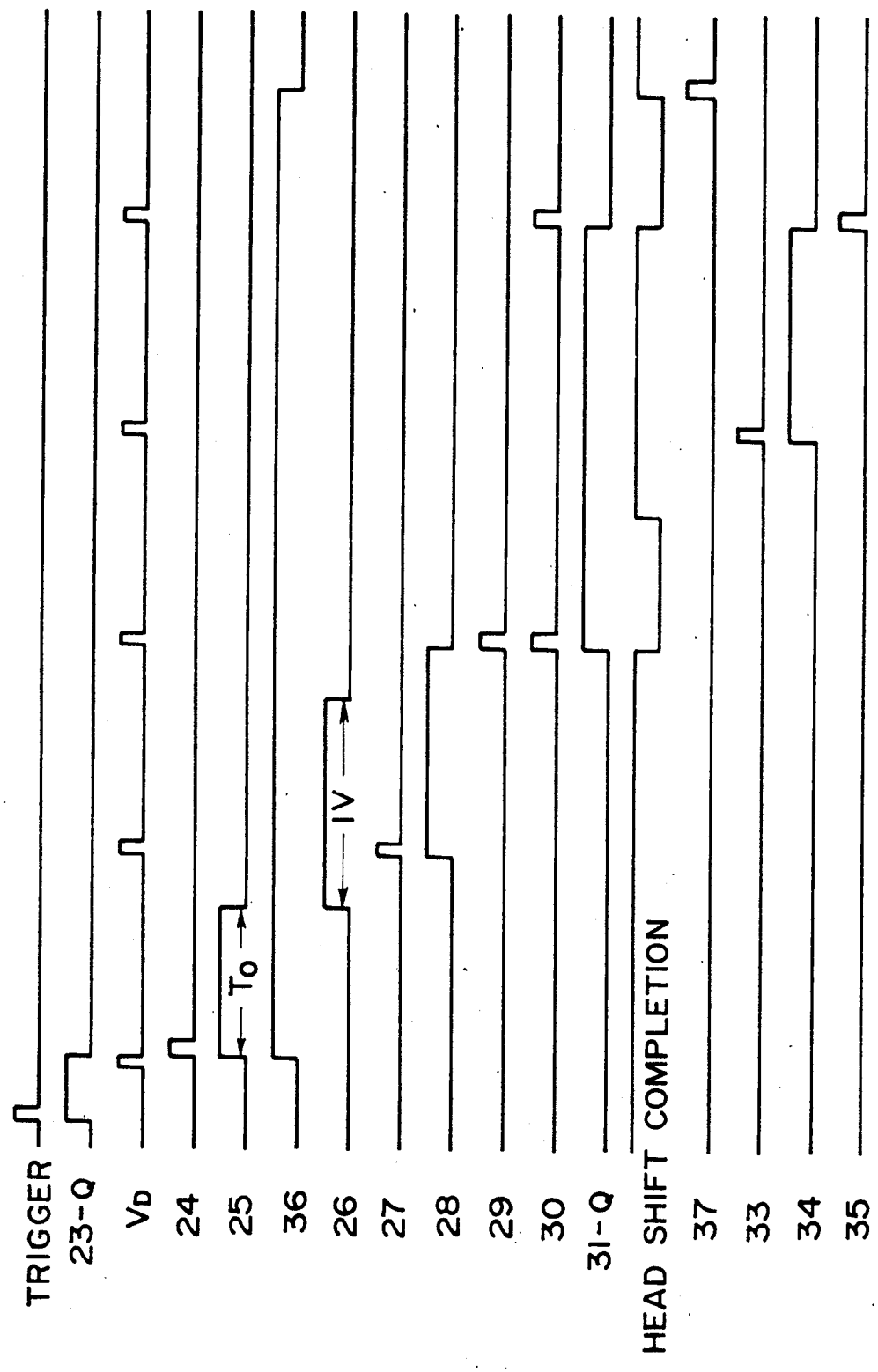
FIG. 3 shows driving, timing charts of the control circuit of FIG. 1.

FIG. 3 shows timing charts of the control circuit shown in FIG. 2. The operation of the circuits shown in FIGS. 1 and 2 will now be described with reference to the timing chart of FIG. 3.

First, pressing the trigger button allows the trigger circuit 49 to form a trigger signal, causing the flip-flop 23 to be set.

Thereafter, the first vertical sync signal $V_D$ is applied through the AND gate 22 to the reset input, causing the Q output of the flip-flop 23 to fall. Thus, the one-shot circuit 24 operates and outputs a higher-level signal for only the time period $T_0$ when the shutter timer 25 has been set into the resistor 38. At the same time, the flip-flop 36 is set and the flip-flop 23 is maintained to be reset until the completion of head shift as will be explained later.

When a predetermined shutter time has elapsed, the shutter timer 25 falls and the higher-level signal for one vertical interval is generated from the one-shot circuit 26. Then, AND of this one-shot output and vertical sync signal $V_D$ is set, thereby sequentially reading out the information on the lines bearing even numbers as will be described later among the charge information formed at the image sensing array synchronously with the first vertical sync signal after closing the shutter. This information is generated as the even-number field signal.

Next, upon completion of reading out of the fields bearing even numbers, the one-shot circuit 29 operates, and the head shift signal is supplied to the stepping motor drive circuit 13 shown in FIG. 1 to revolve the motor 12 by only a predetermined value. Hence, the recording head 9 is shifted by one track pitch through the pinion 11 and rack portion formed on the moving member 10, so that the head faces the next track.

When the motor 12 rotates a predetermined number of times, the shift completion signal is generated from the motor drive circuit 13 and input to the AND gates 32 and 33. At this time, since the flip-flop 31 has already been set by the output of the one-shot circuit 29, only the AND gate 33 is opened synchronously with the next vertical sync signal.

In this embodiment, the shift completion signal is preset to be at a lower level while the power is supplied to the stepping motor 12 by the motor drive circuit 13, and at a higher level while the power supply is stopped.

In this invention, as a result of operation of the ODD timer by the higher-level signal from the AND gate 33, the information on the line bearing odd numbers among the charge information at the image sensing array 1 is sequentially read out, as will be described later, and then generated as the odd-number field signal and recorded on a disk by means of the recording head.

As described above, according to the present invention, there is provided such a feature that the reading out of the next picture is started upon synchronization of the head shift completion signal with the vertical sync signal.

When the fields bearing the odd numbers are read out during only one vertical interval and the information is recorded through the head, the one-shot circuit 35 operates and causes the flip-flop 31 to be reset, and the head shift signal is again output.

When the head shift has been completed and the head shift completion signal at a higher level is again output from the motor drive circuit 13, the flip-flop 36 is reset by AND of the completion signal and the $\bar{Q}$ output of the flip-flop 31.

Hence, the recording of the picture signal of one picture is completed and the flip-flop 23 can be reset by $V_D$.

As described above, in the embodiment of the present invention, there is provided another feature such that the next trigger signal does not substantially function until completion of recording of the signal of two fields.

Next, the reading operation of the CCD by the higher-level outputs of the EVEN and ODD timers 28 and 34 will be described.

Figure 4A:
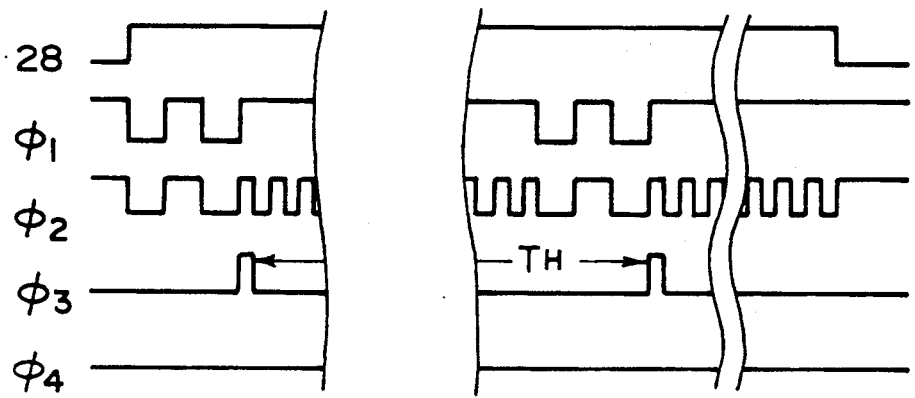
FIGS. 4A and 4B are diagrams showing examples of the read-out clocks of a CCD.
Figure 4B:
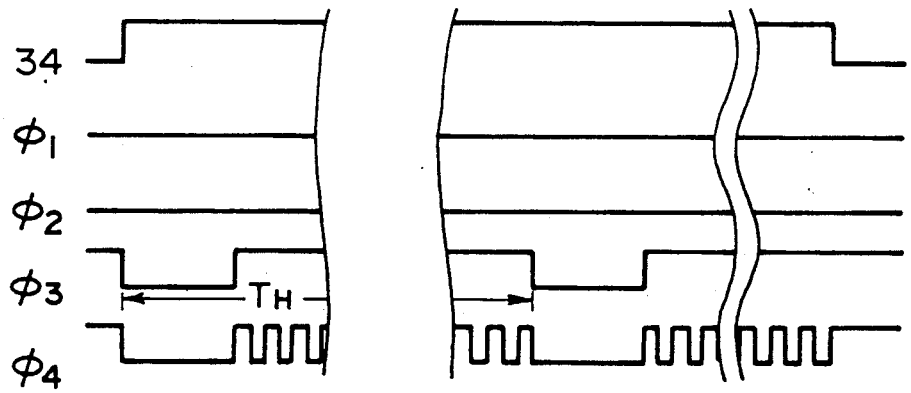

FIGS. 4A and 4B show waveforms of the pulses $\phi_1$–$\phi_4$ to be output from the CCD drive signal generator 39 in response to the outputs of the timers 28 and 34, respectively.

The CCD shown in FIG. 1 is of the single phase drive type and constituted in such a manner that the charge is shifted by one bit at the leading edge from the lower level to higher level by supplying one lower-level pulse to a transfer electrode (not shown).

In the embodiment of the present invention, the horizontal shift register 2, which can read out and generate the picture information at the image sensing array, is provided between the image sensing array and storage array of the frame transfer type CCD, and the amplifier 5 is also provided. Therefore, the present invention also permits a predetermined line information to be extracted through the horizontal shift register 2 midway in the transfer of the picture information formed in the image sensing array 1 to the storage array.

For example, in the present embodiment, the light is projected onto the image sensing array for only a predetermined period of time by means of the shutter SH to produce the picture information of one frame; thereafter, the EVEN timer operates synchronously with the vertical sync signal and it is possible to read out first all of the even-numbered line information among the picture information in this imaging sensing array.

As shown in FIG. 4A, two lower-level pulses are supplied first as $\phi_1$ and $\phi_2$ to shift the charge in the image sensing array to the lower side by two lines in FIG. 1 and to transfer the horizontal register 2 vertically by two lines. A higher-level pulse is supplied to $\phi_3$ to transfer the line information on the first line from the bottom line of the image sensing array 1 shown in FIG. 1 into the storage array. Thereafter, the residual charge of one line in the horizontal shift register 2, namely the charge produced on the second line from the bottom of the image sensing array upon reception of the light is shifted horizontally. While the charge is being shifted horizontally, the lower-level signal is applied to the electrode in the storage array to form the potential barrier in the storage array, thereby preventing the charges in the horizontal shift register from flowing into the storage array. The pitch of pulse $\phi_3$ corresponds to, for example, one horizontal interval $T_H$ as the reading interval of one line.

As shown in FIG. 4B, the lower-level pulses $\phi_3$ and $\phi_4$ are supplied, for example, at every horizontal scanning interval $T_H$ in response to the higher-level output of the ODD timer 34, so that the information in the storage array is stored periodically in the horizontal shift register 4 one line by one. Thereafter, the pulse indicative of the number of picture elements in one line is supplied by the pulse $\phi_4$, so that the information of each line is read out and generated as the odd-number field signal. In this embodiment, the information of the even-numbered lines is initially read out and that of the odd numbered lines is read out later; however, it may be possible to reverse the order.

Figure 5A:
FIGS. 5A and 5B are diagrams showing examples of a head shift completion signal forming device according to the present invention.
Figure 5B:
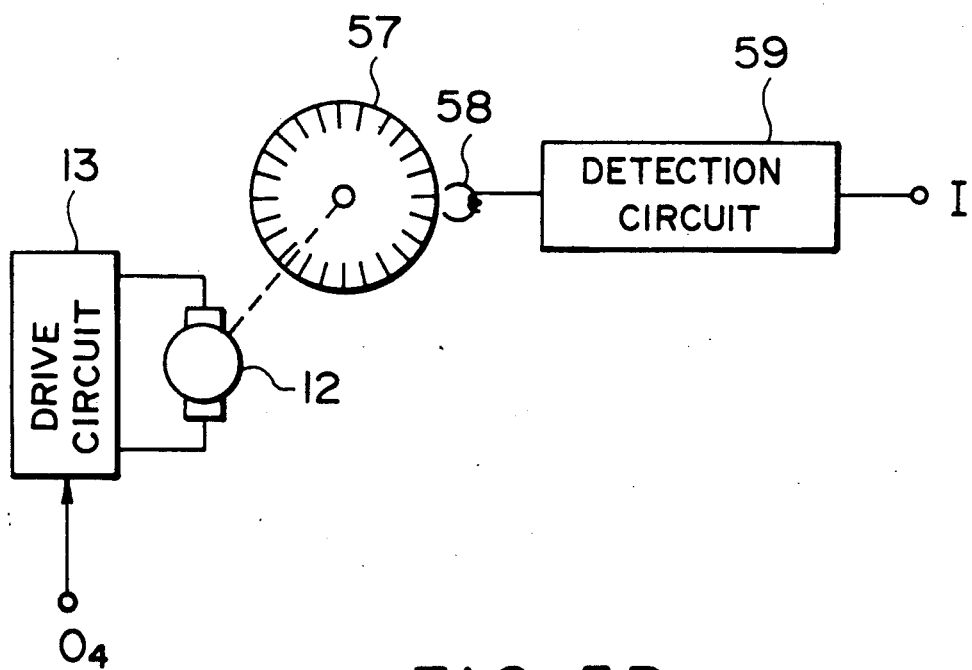

FIGS. 5A and 5B respectively illustrate other examples of the device to form the head shift completion signal of the present invention. According to the delay device shown in FIG. 5A, it outputs the head shift completion signal I in response to the head shift order signal O₄ after the time corresponding to the time when the head shift is completed. This delay device may be a CR timer or a digital counter.

Referring to FIG. 5B, there is provided a rotary disc 57 to be rotated by the stepping motor 12 shown in FIG. 1, and magnetic members are disposed on the rotary disc in accordance with each pitch of the head shift, and a head 58 and a detection circuit 59 to detect the magnetic members are also provided, thereby producing the head shift completion signal I. In other words, when the head 58 faces the magnetic member, the detection circuit 59 outputs a lower-level signal, and unless otherwise, it outputs a higher-level signal.

In the embodiment of the present invention, the storage array of the frame transfer type CCD is used as a temporary memory device; however, the vertical shift register section of the interline transfer type CCD may be used as such a memory device. Or else, it may be possible to memorize the charge information in an ordinary semiconductor memory.

Figure 6:
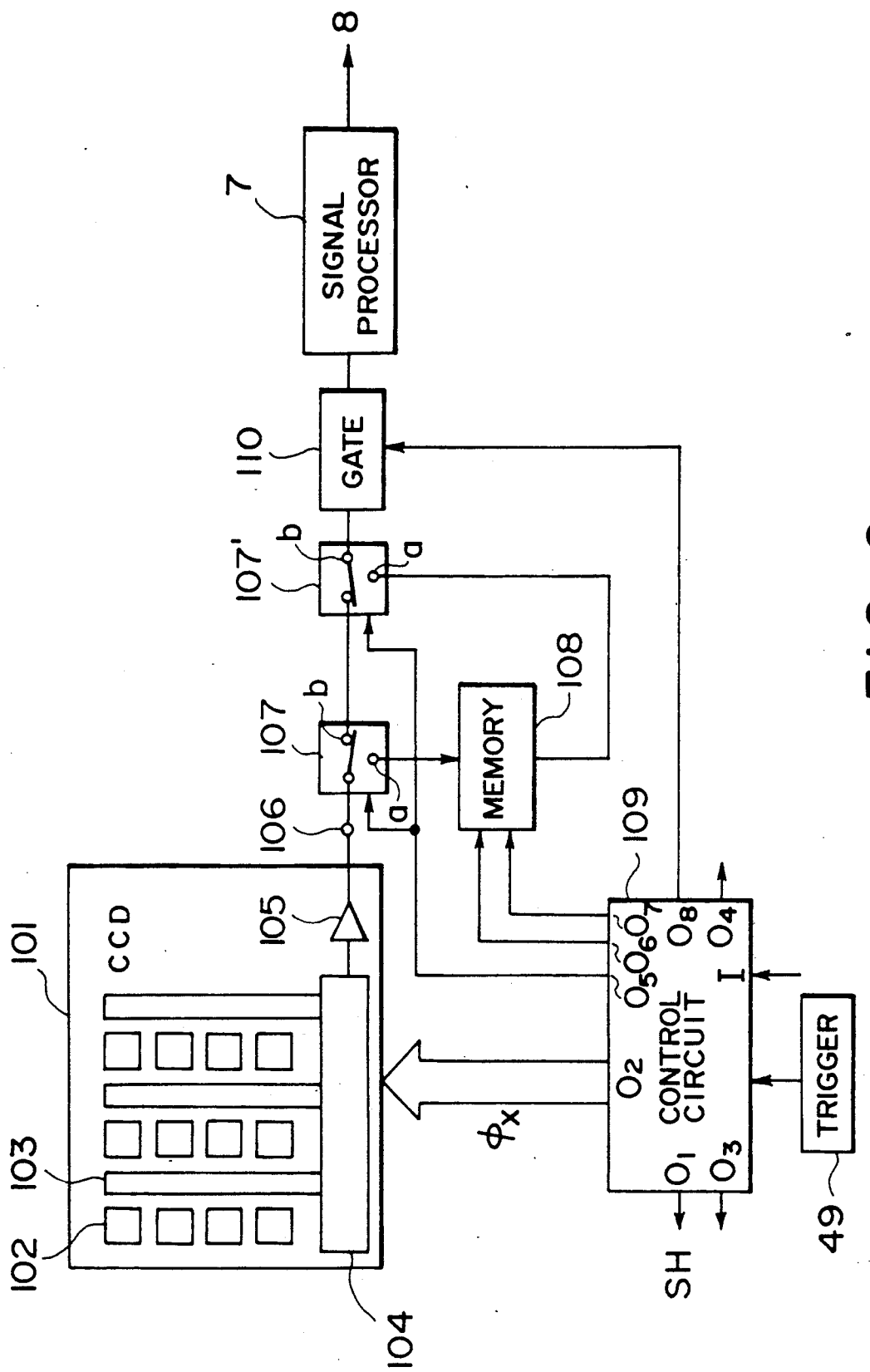
FIG. 6 is a diagrammatic view showing a principal portion in a second embodiment of the recording system of the present invention.

FIG. 6 shows a block diagram of the principal portion of the second embodiment according to the present invention, wherein the same parts and elements as those shown in FIG. 1 are designated by the same reference numerals.

In FIG. 6, an interline transfer type CCD 101 includes: photoreceptive devices 102; vertical shift registers 103; a horizontal shift register 104; and an output amplifier 105, wherein all of these parts except the photoreceptive devices are shielded against light.

As is well known, the light incident upon each photoreceptive device 102 forms photons. These photons are transferred to the vertical shift register by supplying the shift pulse, so that they will not be affected by the light incidence.

Then, the charges of one bit in the vertical shift registers 103 are shifted downward in FIG. 6 every one horizontal period, thereby transferring the charge per line into the horizontal shift register 104. This charge of one line is read out during one horizontal scanning interval by the driving pulse $\phi_x$ to be supplied from a control circuit 109 which will be described later. A reference numeral 106 indicates an output terminal of the CCD 101; 107 and 107' show switches as changeover means; and 108 denotes a field memory as a storage device, which comprises, for example, a semiconductor memory to memorize the picture information of one field. A numeral 109 indicates a control circuit and the similar signals as those in the control circuit shown in FIG. 1 are input to and generated from the terminals O₁–O₄ and I. The driving pulse $\phi_x$ as mentioned above is generated from the terminal O₂.

Figure 7:
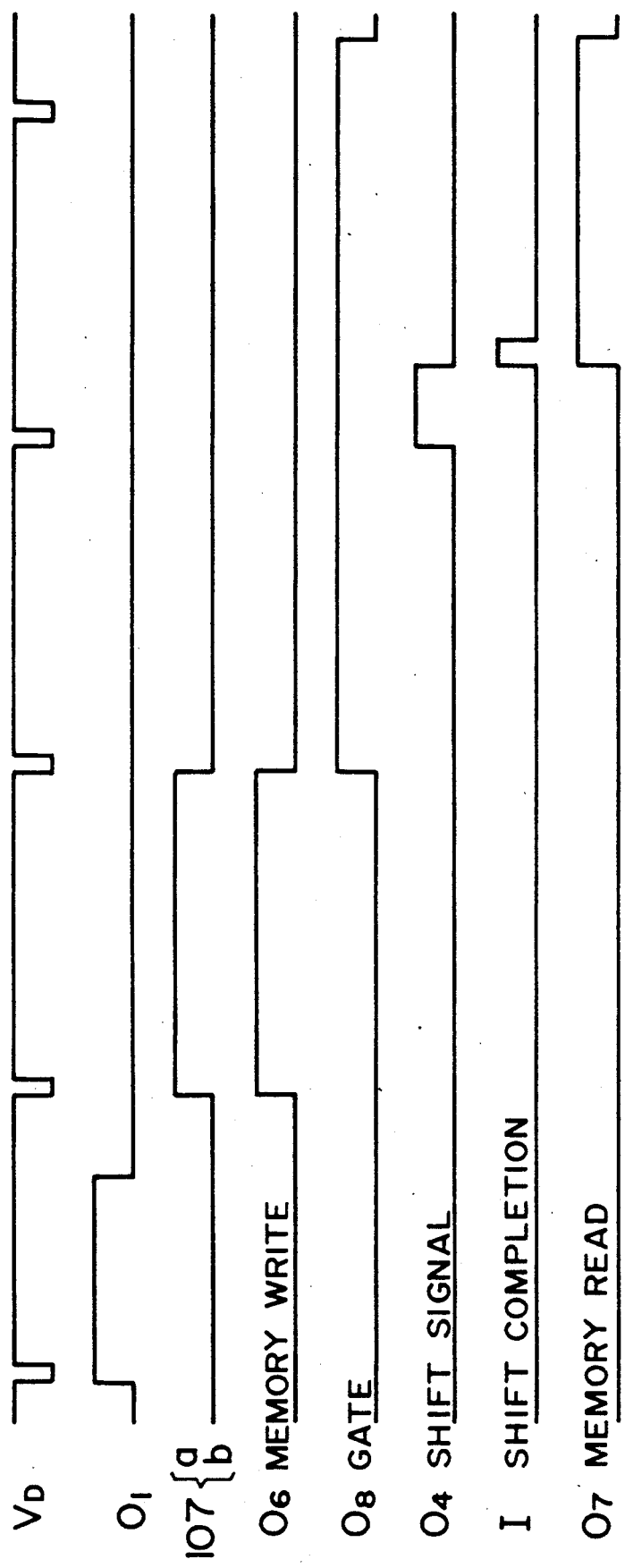
FIG. 7 shows driving timing charts of the system shown in FIG. 6.

FIG. 7 shows timing charts to describe the operation of the circuit shown in FIG. 6. FIG. 6 will now be described hereinbelow with respect to FIG. 7.

The shutter SH is opened for only a predetermined time period synchronously with the first vertical sync signal $V_D$ after a trigger signal has been generated from the trigger circuit 49. A higher-level signal is generated from the terminal O₅ to cause the switches 107 and 107' to be connected respectively to connection points a for only one vertical interval synchronously with the first sync signal $V_D$ after the shutter has been opened, so that the signals of the fields bearing even numbers which were read out from the CCD 101 are stored in the memory 108. During this interval, a write signal is generated from the terminal O₆ to store the above-mentioned signals.

Upon completion of the storage of the signal of one field, the output from the terminal O₅ is reduced to a lower level, causing the switches 107 and 107' to be connected respectively to connection points b. While, the CCD 101 is successively driven to read out the signals of the fields bearing odd numbers.

A higher-level signal is generated from the terminal O₈ for only this one field interval, so that a gate 110 allows the video signal to be supplied to the signal processor 7.

Thus, the output transmitted from the signal processor 7 is recorded on the disc 14 through the amplifier 8 and head 9 shown in FIG. 1.

Then, upon completion of recording of the signals of the fields bearing odd numbers, a shift signal is output from the terminal O₄ to permit the head 9 to be shifted in the same manner as the construction shown in FIG. 1.

When the shift completion pulse at a higher level is obtained upon completion of the shift, a higher-level signal is then generated from the terminal O₇ during one field interval to read out the signals of the even-number fields from the memory 108.

With such a construction, the recording system of the present invention can be operated without using the image pickup-up device of such a particular structure as shown in FIG. 1 even when an ordinary image pick-up device such as the interline transfer type CCD, X-Y address type MOS image sensor, image pick-up tube, etc. is used.

In the embodiments of the present invention, the output of the image pick-up device is recorded in a recording medium; however, an output from any other general signal sources may be also recorded.

As a recording medium, any other types of medium may be used, such as a tape-like or a card-like recording medium in place of the disk. In this case, other recording methods may be used instead of the method of magnetic recording. Furthermore, the relative location of the recording head and recording medium may be changed by moving the recording medium as well as shifting the recording head.

As described above, according to the present invention, in a recording system for recording the information while operating the head sequentially in different portions on the recording medium, the signals can be always and stably recorded without deleting the first portion of recording signals even if a variation occurs in the time necessary for the head to be shifted. In addition, even if it takes a long time to shift the head, the continuous signals can be recorded.

Therefore, in a recording system which records a video signal of one field on each track using one head, many effects are obtained such that it is possible to record the signals of successive two fields and obtain a picture with high quality when the recorded signals are played back, or the like.

What we claim is:

1. A still video recording apparatus comprising:
   means for converting an optical image into a frame video signal which consists of two field video signals which are formed simultaneously and for sequentially outputting said two field video signals one by one;
   means for recording said two field video signals on a medium, said recording means recording each of said field video signals in a different location of said medium, respectively, after a predetermined operation which is performed before the recording operation;
   means for detecting completion of said predetermined operation of said recording means and for generating a detection signal; and
   control means for controlling the outputting operation of said converting and outputting means in response to said detecting signal.

2. An apparatus according to claim 1, wherein said converting means includes:
   first converting part for generating one of said two field video signals;
   second converting part for generating the other of said two field video signals; and
   read out means for outputting said one of said video signals from said first converting part and then outputting said other of said video signals from said second converting part.

3. An apparatus according to claim 1, wherein said recording means includes:
   a recording head;
   means for changing a position of said recording head relative to said medium as said predetermined operation of said recording means; and
   drive means for driving said changing means to change the position of said recording head on said medium after a first field video signal of a plurality of field video signals output sequentially from said converting means is recorded by said recording head.

4. An apparatus according to claim 3, wherein said control means causes said converting means to output the next field video signal after a change operation of said change means is completed.

5. A video recording apparatus comprising:
   (a) means for generating a frame signal made of a plurality of field video signals which are formed simultaneously and for sequentially outputting said plurality of field video signals;
   (b) means for recording said plurality of field video signals on a medium, said recording means recording each of said field video signals in a different location of said medium, respectively, after a predetermined operation which is performed before the recording operation;
   (c) means for detecting completion of said predetermined operation of said recording means and for generating a detection signal; and
   (d) control means for controlling the outputting operation of said generating and outputting means in response to said detecting signal.

6. An apparatus according to claim 5, wherein said generating and outputting means comprises:
   first means for outputting one of said field video signals;
   second means for outputting the other of said field video signals; and
   read out means for reading out said one of said field video signals from said first means and then reading out said other of said field video signals from said second means.

7. An apparatus according to claim 6, wherein said first means comprises a plurality of photoconverting elements.

8. An apparatus according to claim 7, further comprising shutter means for selectively shielding said first means from light.

9. An apparatus according to claim 8, further comprising shutter control means for simultaneously forming said plurality of field signals by irradiating light to said first means for a predetermined time.

10. An apparatus according to claim 9, wherein said plurality of field signals are signals which are interlaced with each other.

11. An apparatus according to claim 6, wherein said second means comprises memory means for storing a field video signal.

12. An apparatus according to claim 6, wherein said first means and said second means comprise CCD's.

13. An apparatus according to claim 6, wherein said recording means comprises:
    a recording head;

means for changing a position of said recording head relative to said medium as said predetermined operation of said recording means; and drive means for driving said changing means to change the position of said recording head on said medium after a first field video signal of a plurality of field video signals output sequentially from said generating and outputting means is recorded by said recording head.

14. An apparatus according to claim 13, wherein said control means causes said generating and outputting means to output the next field video signal after said first video signal when a change operation of said change means is completed.

15. An apparatus according to claim 5, wherein said plurality of field signals are signals which are interlaced with each other.

16. An apparatus according to claim 15, wherein said plurality of field signals are signals which are simultaneously formed.

17. A video recording apparatus comprising:
 (a) an interline transfer type CCD for generating a frame signal made of two field video signals which are formed simultaneously and for sequentially outputting said two field video signals;
 (b) shutter means for exposing said interline transfer type CCD to form said frame signal;
 (c) means for recording said plurality of field video signals on a medium, said recording means recording each of said field video signals in a different location of said medium, respectively, after a predetermined operation which is performed before the recording operation;
 (d) means for detecting completion of said predetermined operation of said recording means and for generating a detection signal; and
 (e) control means for controlling the outputting operation of said interline transfer-type CCD in response to the operation of said detecting means.

18. An apparatus according to claim 17, wherein said plurality of field signals are signals which are interlaced with each other.

19. An apparatus according to claim 17, wherein said detecting means detects whether a relation between a recording head and a recording medium reaches a predetermined relation.

20. An apparatus according to claim 17, wherein said detecting means includes a timer.

* * * * *

UNITED STATES PATENT AND TRADEMARK OFFICE
CERTIFICATE OF CORRECTION

PATENT NO. : 5,047,875

DATED : September 10, 1991

INVENTOR(S) : Susumu Kozuki, et al.

It is certified that error appears in the above-identified patent and that said Letters Patent is hereby corrected as shown below:

COLUMN 2

Line 22, "driving," should read --driving--.

COLUMN 10

Line 61, "respectively," should read --respectively.--.

Signed and Sealed this

First Day of June, 1993

Attest:

MICHAEL K. KIRK

Attesting Officer     Acting Commissioner of Patents and Trademarks